US007555292B2

(12) United States Patent
Xie et al.

(10) Patent No.: US 7,555,292 B2
(45) Date of Patent: Jun. 30, 2009

(54) DIRECTIONAL INFORMATION DELIVERY SYSTEM AND METHOD

(75) Inventors: Wei Kai Xie, Shanghai (CN); Yudong Yang, Beijing (CN); Hang Jun Ye, Beijing (CN); Tao Zhou, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 487 days.

(21) Appl. No.: 11/410,488

(22) Filed: Apr. 25, 2006

(65) Prior Publication Data
US 2006/0258288 A1 Nov. 16, 2006

(30) Foreign Application Priority Data
Apr. 26, 2005 (CN) .................. 2005 1 0067826

(51) Int. Cl.
*H04Q 7/22* (2006.01)
(52) U.S. Cl. .................. 455/414.3; 455/424; 455/425; 370/328; 370/338
(58) Field of Classification Search ............. 455/414.3, 455/424, 425; 370/328, 338
See application file for complete search history.

(56) References Cited
U.S. PATENT DOCUMENTS
6,542,464 B1 * 4/2003 Takeda et al. .............. 370/230
* cited by examiner

*Primary Examiner*—Nghi H Ly
(74) *Attorney, Agent, or Firm*—Kenneth R. Corsello; Anne Vachon Dougherty (57) ABSTRACT

A directional information delivery method and system, wherein a wide-angle electromagnetic wave transmitter is attached on each object for transmitting channel identification that indicates the transferring channel of the information of the exhibited item attached with the wide-angle electromagnetic wave transmitter to a specified area in wide angle, while each portable client device is provided with a directional electromagnetic wave receiver. When a user points the client device he/she to an object, it can receive the electromagnetic wave from that exhibited item. Then, the client device obtains a channel identification from that electromagnetic wave, and establishes a connection with an information delivery sub-system based on the obtained channel identification to obtain information about that exhibited item from the channel and to render that information. In this way, a user can select simply by pointing at the exhibited item with the client device, thereby accurately obtaining the information about the exhibited item of interest.

18 Claims, 6 Drawing Sheets

DIRECTIONAL INFORMATION DELIVERY SYSTEM AND METHOD

FIELD OF THE INVENTION

The present invention generally relates to an information delivery system and method, in particular, to a directional information delivery system and method.

BACKGROUND OF THE INVENTION

In a trade show, an exhibition or a similar environment, in order to help participants to get the most out of the visit, there are usually some electronic tour-guide (purchase guide) systems provided which allow users to browse or hear more information of an object they are interest in through a portable client device. Based on the way these systems decide of which object the user is interest in, generally they can be divided into two types. In the first type of systems, the user should manually key in the identification (ID) of the object he/she is interest in on his/her client device. However, this is quite troublesome for users. The second type of systems is the so-called location-based system, where some kind of location detection mechanism (such as radio frequency identification (RFID)) is used, and the client device will automatically deliver the information of an object to the user when the user is standing approximate to this object. Although this type of system is more convenient than the first one, it has following drawbacks. First, when there are several objects with same or similar distance and directional angle to the user, there is no reliable way to decide which object should be the one the user is interested in. Second, after all, the location approximation has no certain relation with a user's real interest. For example, when the user is facing and looking at a picture hanged on the wall several steps away while there is another exhibited item just next to the user's side, in this case, the object closest to the user is not the one the user is actually interested in. So, the object information delivered to the user by a location-based system is not the information of the object the user is actually interested in.

SUMMARY OF THE INVENTION

In view of the above, the present invention provides a system and method that can deliver the information of an exhibited item to a user accurately.

According to one aspect of the invention, there is provided a directional information delivery system, comprising:

a wide-angle electromagnetic wave transmission means attached on a corresponding object for transmitting electromagnetic wave with strong line-of-sight propagation nature to a specified area in wide angle, the electromagnetic wave carries thereon a channel identification for identifying a channel, wherein the channel identification indicates the channel for transferring the information of the object attached with the wide-angle electromagnetic wave transmission means;

an information delivery sub-system for transferring the information of different objects via different channels in wireless form; and a portable client device, comprising: a directional electromagnetic wave reception means for receiving electromagnetic wave from a wide-angle electromagnetic wave transmission means in a specified direction, and obtaining a channel identification from the electromagnetic wave; and information reception means for establishing a connection with the information delivery sub-system based on the channel identification obtained by the directional electromagnetic wave reception means, and obtaining information from the channel indicated by the channel identification and rendering that information.

According to another aspect of the invention, there is provided a directional information delivery method, comprising the steps of:

transmitting electromagnetic wave with strong line-of-sight propagation nature to a specified area in wide angle by a wide-angle electromagnetic wave transmission means attached on a corresponding object, the electromagnetic wave carries thereon a channel identification for identifying a channel, wherein the channel identification indicates the channel for transferring the information of the object attached with the wide-angle electromagnetic wave transmission means; and receiving electromagnetic wave from a wide-angle electromagnetic wave transmission means in a specified direction by a portable client device, and obtaining a channel identification from the electromagnetic wave, establishing a connection with an information delivery sub-system based on the channel identification obtained, and obtaining information from the channel indicated by the channel identification and rendering that information.

When the directional information delivery system and method of the invention is applied in a trade show, an exhibition or a similar environment, such a wide-angle electromagnetic wave transmission means is attached on each exhibited item for transmitting channel identification that indicates the transferring channel of the information of the exhibited item attached with the wide-angle electromagnetic wave transmission means to a specified area in wide angle, while each portable client device is provided with a directional electromagnetic wave reception means. When a user points the client device he/she carries to an exhibited item, it can and only can receive the electromagnetic wave from that exhibited item. Then, the client device obtains a channel identification from that electromagnetic wave, and establishes a connection with an information delivery sub-system based on the obtained channel identification, and obtains information about that exhibited item from the channel indicated by the channel identification and renders that information. In this way, a user can make proactively selection simply by pointing at the exhibited item he/she is interested in with the client device, thereby accurately obtaining the information about the exhibited item he/she is interested in.

The directional information delivery system and method according to the invention is much convenient than the first type of system in the prior art in which a user needs to manually input the identification of an exhibited item he/she is interested in, and also is more accurate in the sense of reflecting user's real interest compared to the location-based second type of system.

Additionally, in the directional information delivery system and method according to the invention, instead of the exhibited item's information itself, what is transferred through the electromagnetic wave with strong line-of-sight propagation nature is the channel identification that indicates the transferring channel of the information of the exhibited item, so very low data band is needed. In the directional information delivery system and method according to the invention, much complex error-correction encoding scheme can be employed, thereby ensuring this kind of electromagnetic wave transmission with strong line-of-sight propagation nature is more robust against interference.

BRIEF DESCRIPTION OF THE DRAWINGS

The novel feature believed be characteristic of the invention are set forth and the subject mater claimed in the invention are specifically pointed out in the appended claims at the conclusion of this specification. The invention itself, however, as well as a preferred mode of use, the above and other objectives, features and advantages thereof, will be apparent from the following detailed description when read in conjunction with the accompanying drawings, wherein:

DETAILED DESCRIPTION OF THE PREFERRED EMBODIMENTS

Now referring to drawings, the directional information delivery system and method according to preferred embodiments of the invention would be described in detail.

Figure 1:
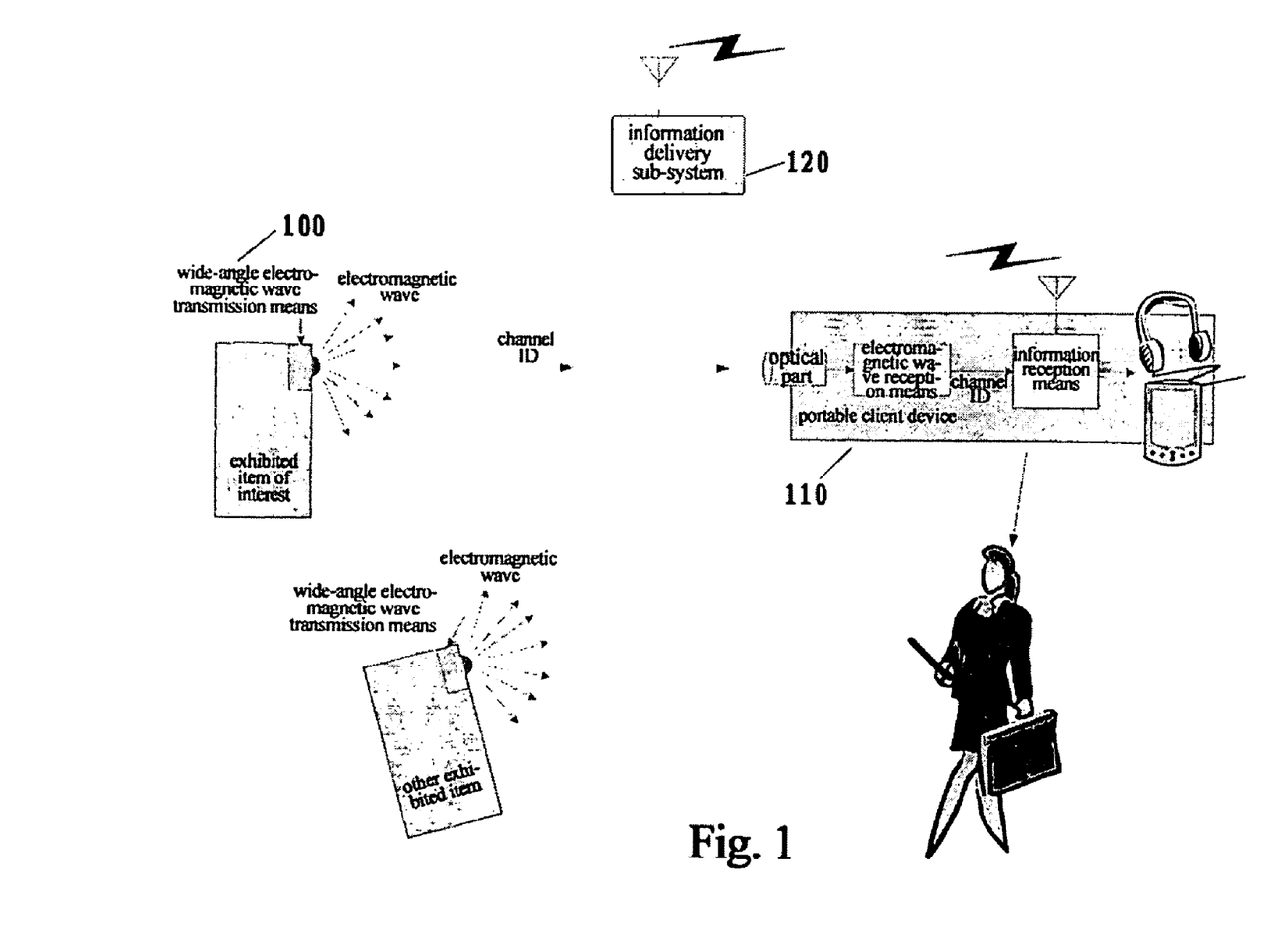
FIG. 1 is a schematic diagram showing the working principle of the directional information delivery system according to the invention.

FIG. 1 is a schematic diagram showing the working principle of the directional information delivery system according to the invention. As shown in FIG. 1, in the directional information delivery system according to preferred embodiments of the invention, each object or exhibited item is attached with a wide-angle electromagnetic wave transmission means 100 for transmitting electromagnetic wave to a specified area in wide angle, the effective data carried on the electromagnetic wave is a channel identification which indicates the channel for transferring the information of the exhibited item attached with the wide-angle electromagnetic wave transmission means. Each portable client device 110 is provided with a directional electromagnetic wave reception means. When a user points the client device he/she carries to an exhibited item, it can and only can receive the electromagnetic wave from that exhibited item. Then, the client device obtains a channel identification by decoding the electromagnetic wave, establishes a connection with an information delivery subsystem 120 based on the obtained channel identification, and obtains information about that exhibited item from the channel indicated by the channel identification and renders that information. In this way, a user can make proactively selection simply by pointing at the exhibited item he/she is interested in with the client device, thereby accurately obtaining the information about the exhibited item he/she is interested in.

Next, the composition of the directional information delivery system according to preferred embodiments of the invention will be described in conjunction with FIGS. 2, 3 and 4, respectively.

Figure 2:
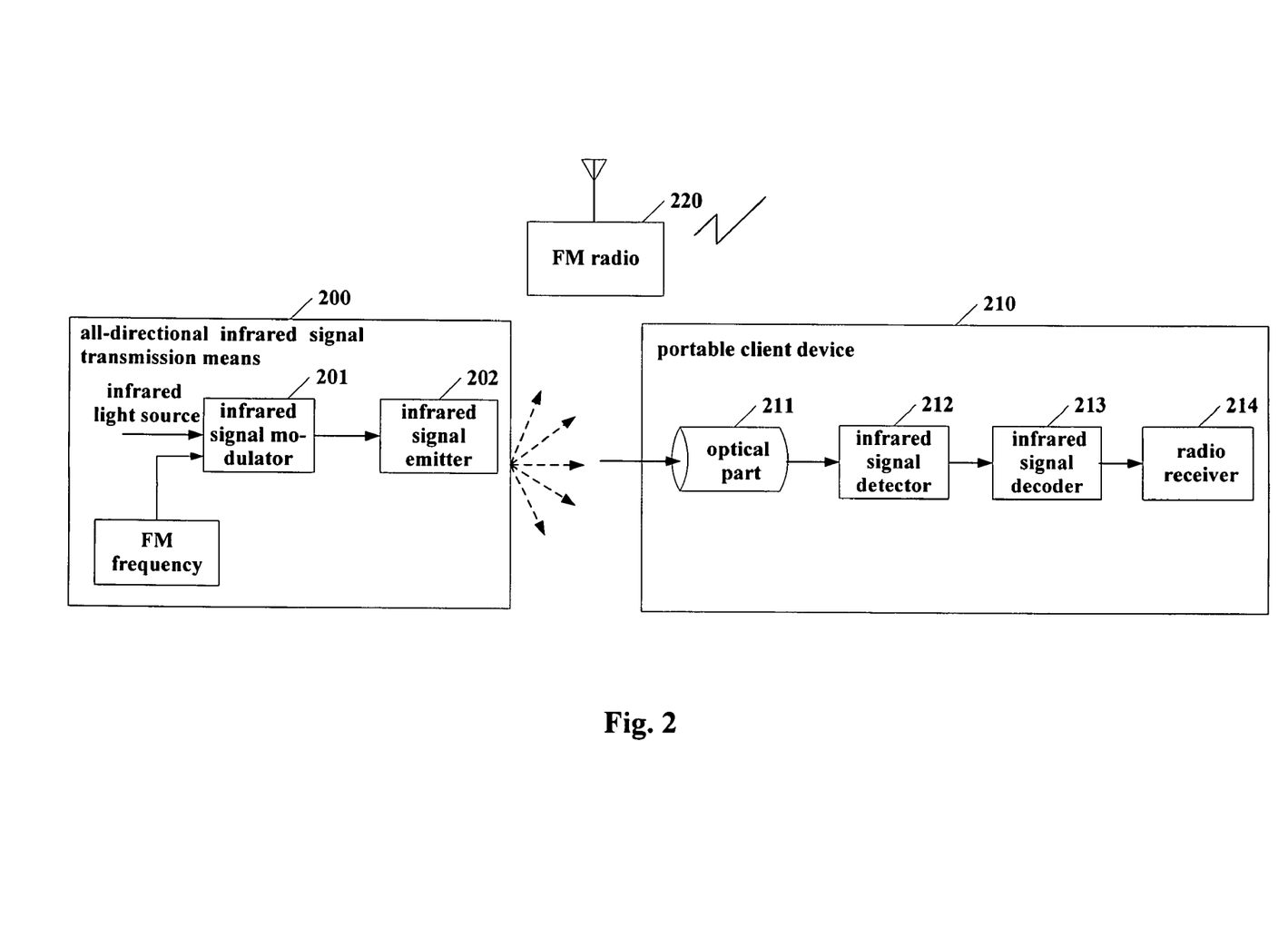
FIG. 2 is a block diagram showing the composition of the directional information delivery system according to a first preferred embodiment of the invention.

As shown in FIG. 2, the directional information delivery system according to a first preferred embodiment of the invention comprises an all-directional infrared signal transmission means 200 for transmitting infrared signal in each direction, a portable client device 210 carried by a user, and a FM radio 220 for transmitting information about respective exhibited items at respective frequencies. Wherein, the all-directional infrared signal transmission means 200 comprises an infrared signal modulator 201 and an infrared signal emitter 202. The infrared signal modulator 201 modulates the infrared signal emitted from an infrared light source (e.g. through PWM which modulates the signal by changing the pulse width and through PPM which modulates the signal by changing the time period between pulse trains), that is, loads the effective data to be transferred on the original infrared signal. In the embodiment, the effective data to be transferred is a FM frequency, the FM radio 220 transmits the information of the exhibited item attached with the infrared signal transmission means at that frequency. The infrared signal emitter 202 transmits modulated infrared signal in each direction (all-direction or near all-direction), such that the portable client device can receive its transmitted infrared signal in each direction. The portable client device 210 includes an optical part 211, an infrared signal detector 212, an infrared signal decoder 213 and a radio receiver 214. The function of the optical part 211 is to make the infrared signal detector can and only can receive the infrared signal from a specified direction, the infrared signal decoder 213 decodes the infrared signal detected by the infrared signal detector 212 to obtain the effective data therein, namely, a FM frequency. The radio receiver 214 tunes to that FM frequency, receives from FM radio 220 the information about the exhibited item attached with the infrared signal transmission means 200 and render that information for the user.

Although in FIG. 2, the directional information delivery system according to a first preferred embodiment of the invention is described with an all-directional (or near all-directional) infrared signal transmission means, it will be apparent to those of skilled in the art that, since an exhibited item is generally hanged on the wall, one would generally access the exhibited item from the front or one side of the exhibited item (instead of from the back of it), in this case it is not necessary for the infrared signal transmission means to be all-directional, a wide-angle infrared signal emitter similar to an existing television remote controller can meet the requirements and can assure that a user will receive the infrared signal from the front or one side of the exhibited item. Moreover, it will be apparent to those of skilled in the art that other electromagnetic wave transmission means with strong line-of-sight propagation nature such as a visible light emitter etc. can be employed to replace the infrared signal transmission means.

In addition, the optical part 211 can simply be a straight tube, at this time, the infrared signal detector 212 can only receive the infrared signal emitted from the infrared signal transmission means which directly faces the optical part 211. In this way, a user can make proactively selection simply by pointing at the exhibited item he/she is interested in with the client device, thereby accurately obtaining the information about the exhibited item he/she is interested in. In addition to simply be a straight tube, the optical part 211 can be an optical lens, such as an optical lens that has a receiving angle of 30 degrees. In this case, each of exhibited items should keep certain distance away from others.

Additionally, in order to further ensure that the infrared signal detected by the infrared signal detector 212 is the infrared signal transmitted from the infrared signal transmission means on the exhibited item that the user is interested in, an on/off means can be provided on the portable client device (or infrared signal detector 212), the infrared signal detector 212 will not be turned on until the user has pointed the client device at the exhibited item he/she is interested in to avoid receiving the infrared signal transmitted from the infrared signal transmission means on other exhibited items during the pointing action. As a alternative solution to ensure that the infrared signal detected by the infrared signal detector 212 is the infrared signal transmitted from the infrared signal transmission means on the exhibited item that the user is interested in, a control module can be added on the infrared signal detector 212, the control module detects the stability of the infrared signal detected by the infrared signal detector 212, and the infrared signal will be sent to the infrared signal decoder 213 only when the stability time of the detected infrared signal exceeds a threshold.

Additionally, in order to solve the problem that it cannot be ensured to assign a unique FM channel for each exhibited item due to the great number of the exhibited items, in the embodiment according to the invention, the exhibited item can be grouped so as to assign a unique FM channel for each group of exhibited items. In this case, since what is sent by the FM radio 220 at a FM channel is the information of a group of exhibited items, what is received by the user through the radio receiver 214 is the information of that group of exhibited items to which the exhibited item of interest belongs. In order to further identify the exhibited item that the user has real interest, the effective data "FM frequency+exhibited item's ID" is loaded onto the infrared signal, and when the radio receiver 214 has received the effective data "FM frequency+exhibited item's ID" from the infrared signal decoder 213, it will store the exhibited item's ID and tune to a corresponding FM frequency. The radio 220 will add the exhibited item's ID to the head of the information of each exhibited item, and when the radio receiver 214 has received the information of the exhibited item that matches its stored exhibited item's ID, it will remind the user.

The directional information delivery system according to a first preferred embodiment of the invention is described in conjunction with FIG. 2 in the above. In that embodiment, a radio is utilized to deliver the information about an exhibited item. For users, however, they not only desire to get the audio information about an exhibited item, but also they are more desirable to get the video information about the exhibited item or multimedia information that contains picture and text description of the exhibited item. The directional information delivery system according to a second preferred embodiment of the invention will be described in the following in conjunction with FIG. 3.

Figure 3:
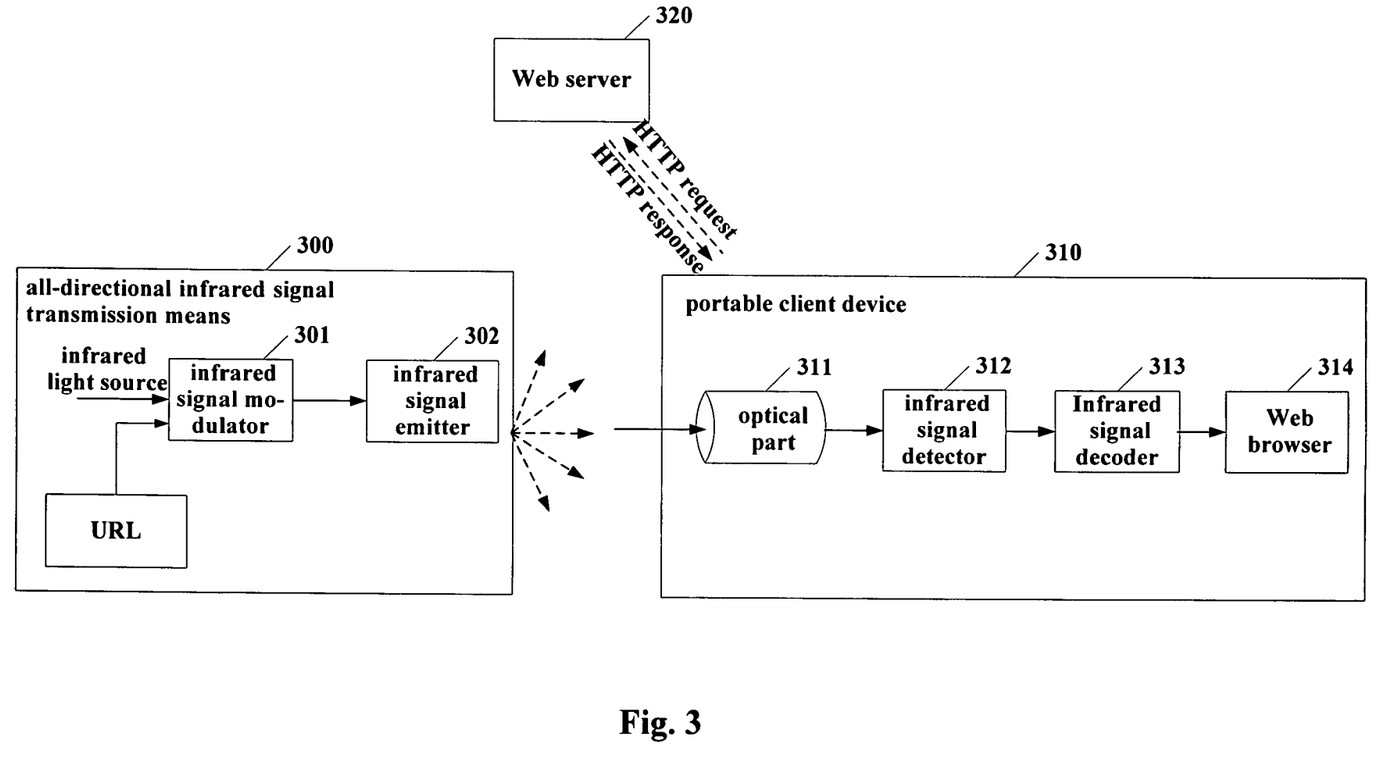
FIG. 3 is a block diagram showing the composition of the directional information delivery system according to a second preferred embodiment of the invention.

As shown in FIG. 3, in the directional information delivery system according to a second preferred embodiment of the invention, a Web server 320 is utilized to deliver the information about an exhibited item. In that embodiment, a portable client device 310 includes a Web browser 314, and the effective data modulated on an infrared signal modulator 301 is a Web page's Uniform Resource Locator (URL). In that embodiment, the description about each exhibited item can be stored on Web server 320 in the form of a Hypertext Markup Language (HTML) document. When a user selects (points to) an exhibited item with the portable client device he/she carries, the portable client device will receive the infrared signal sent from the all-directional infrared signal transmission means 300 attached on that exhibited item. The effective data URL carried on that infrared signal indicates the address of the Web page where the information of the exhibited item resides on the Web server 320. An infrared signal decoder 313 delivers the Web page's URL obtained from the infrared signal after decoding to the Web browser 314. The Web browser 314 initiates a connection with the Web server 320 and the Web server 320 responses to that connection. After that, the Web browser 314 sends a HTTP request that contains the Web page's URL to the Web server 320. The Web server 320 sends the requested Web page (which contains the information about the exhibited item selected by the user) to the Web browser 314 as a response. The Web browser 314 presents the Web page to the user. The hardware devices on which the Web browser 314 resides may be various pervasive computing devices, such as a PDA etc.

In the directional information delivery system according to a second preferred embodiment of the invention, it is a Web server 320 that is utilized to deliver the information about an exhibited item, that is: the description about each exhibited item is stored on the Web server 320 in the form of a Hypertext Markup Language (HTML) document. Since the Web page resource is not so limited as the FM channel resource, it can be ensured that each exhibited item will have a unique Web page URL even if there are a great number of exhibited items. In addition, the directional information delivery system according to a second preferred embodiment of the invention can provide multimedia information that contains picture and text description of the exhibited item to a user.

Figure 4:
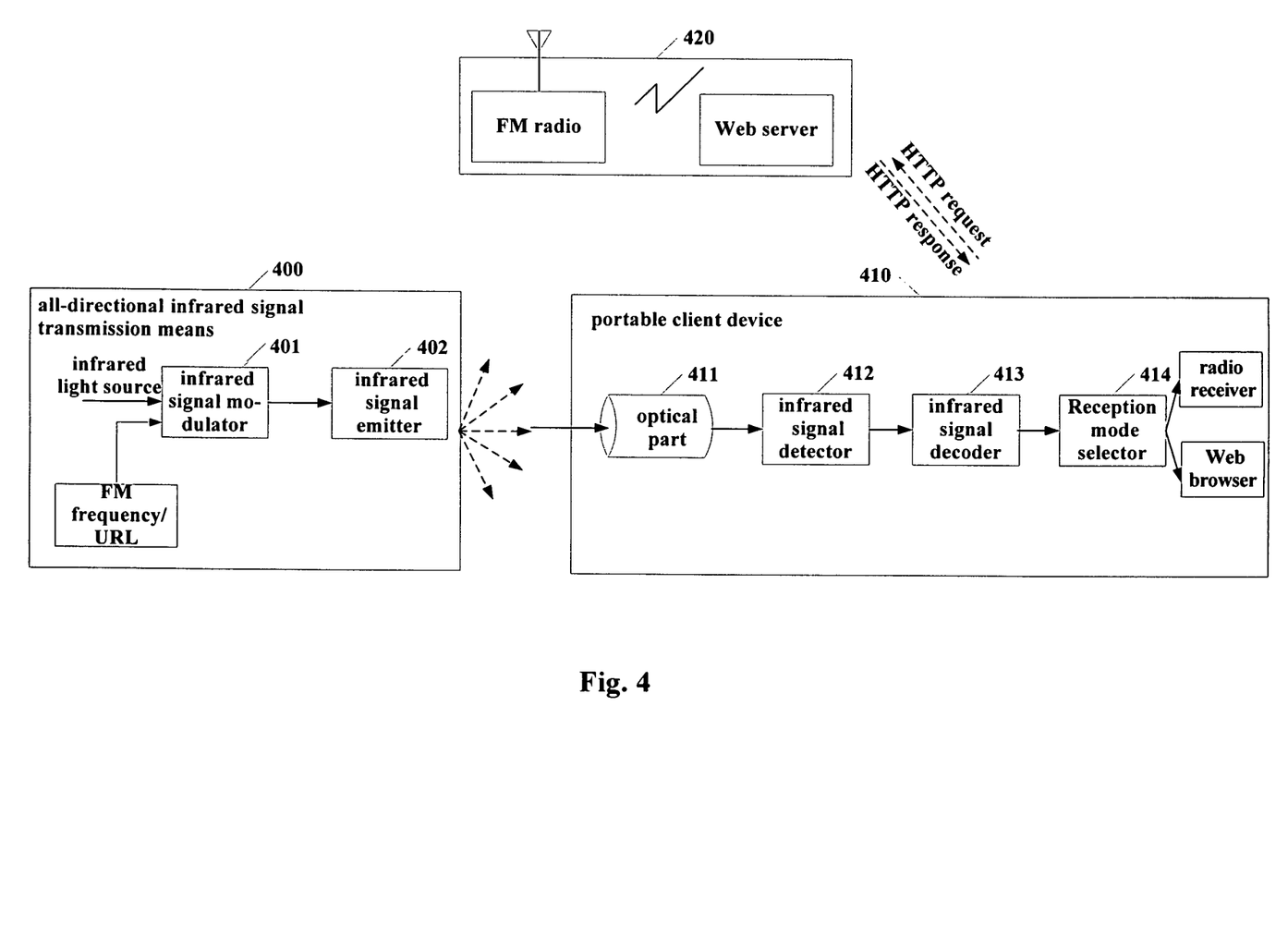
FIG. 4 is a block diagram showing the composition of the directional information delivery system according to a third preferred embodiment of the invention.

FIG. 4 shows the directional information delivery system according to a third preferred embodiment of the invention. In that system, the effective data carried on the infrared signal is "FM frequency+URL", and two selectable forms for the information of an exhibited item is provided for a user: audio form and multimedia form. A user can select based on his/her own preference, either to listen to the information of an exhibited item in audio form or to view the information of an exhibited item through a browser. Therefore, in the directional information delivery system according to a third preferred embodiment of the invention, the portable client device is provided with a reception mode selector 414 which can activate a corresponding information reception means based on the user's selection or the property of the information reception means provided with the portable client device.

The directional information delivery systems according to preferred embodiments of the invention are described in the above in conjunction with FIGS. 2, 3, 4, respectively. From the above it can be seen that, since the infrared signal emitted by the infrared signal transmission means attached on an exhibited item has a strong line-of-sight propagation nature and the infrared signal reception means on the portable client device is directional, a user can make proactively selection simply by pointing at the exhibited item he/she is interested in with the client device, thereby accurately obtaining the information about the exhibited item he/she is interested in.

Figure 5:
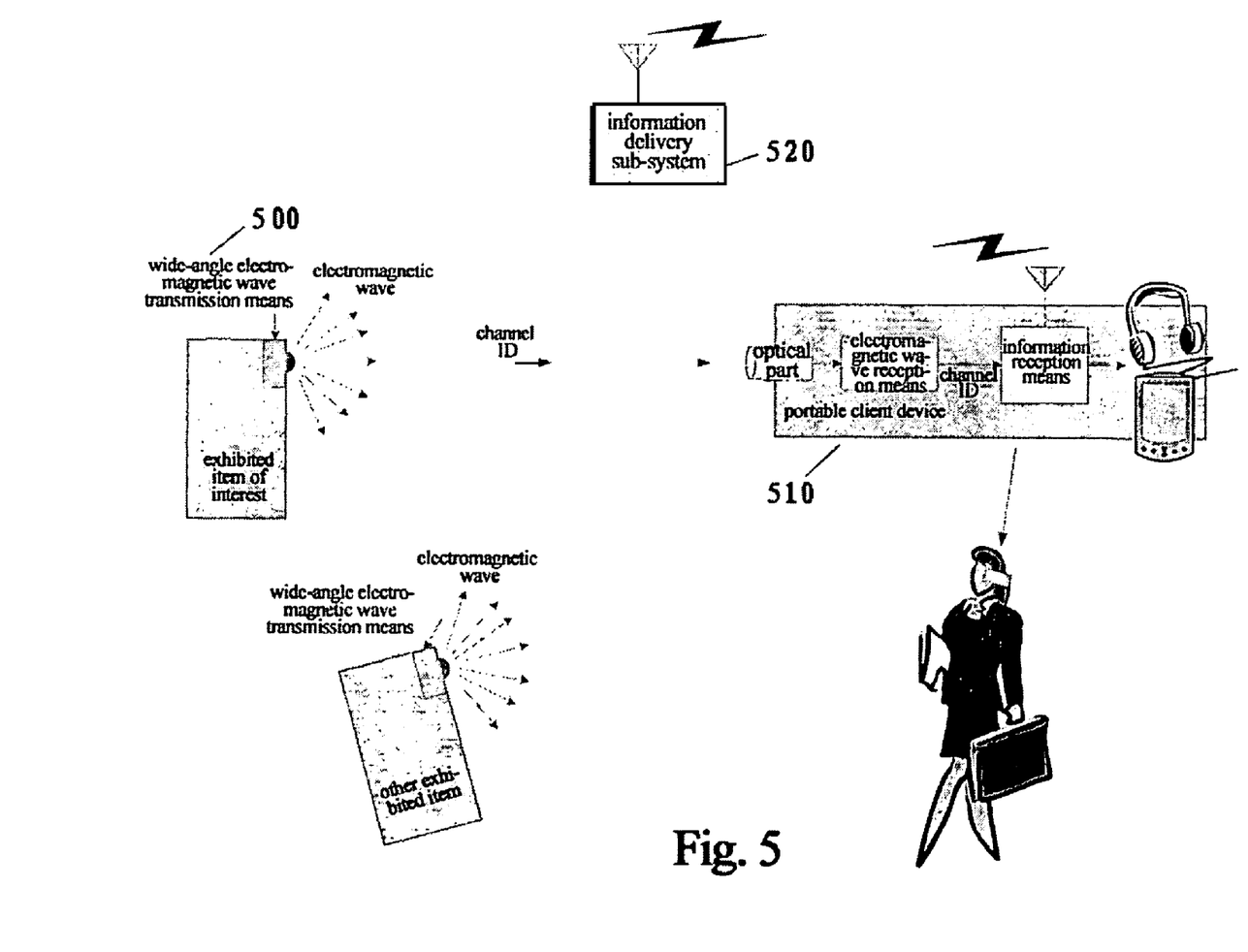
FIG. 5 shows a preferred mode of use of the directional information delivery system according to the invention.

In addition, as shown in FIG. 5, as a preferred mode of use, the user can wear the portable client device or only the portion of device that is related to detection of infrared signal on the ear, and ensure that the detector points to the direction the user is facing. Thus, the user can complete selection simply by facing the exhibited item he/she is interested in. Since the propagation distance of the infrared signal is generally within 5 meters, which is just a man's eye distance, if the above preferred mode of use is employed, the effect that what is seen by the user is what is selected by the user can be achieved, thereby realizing "view-and-select".

Figure 6:
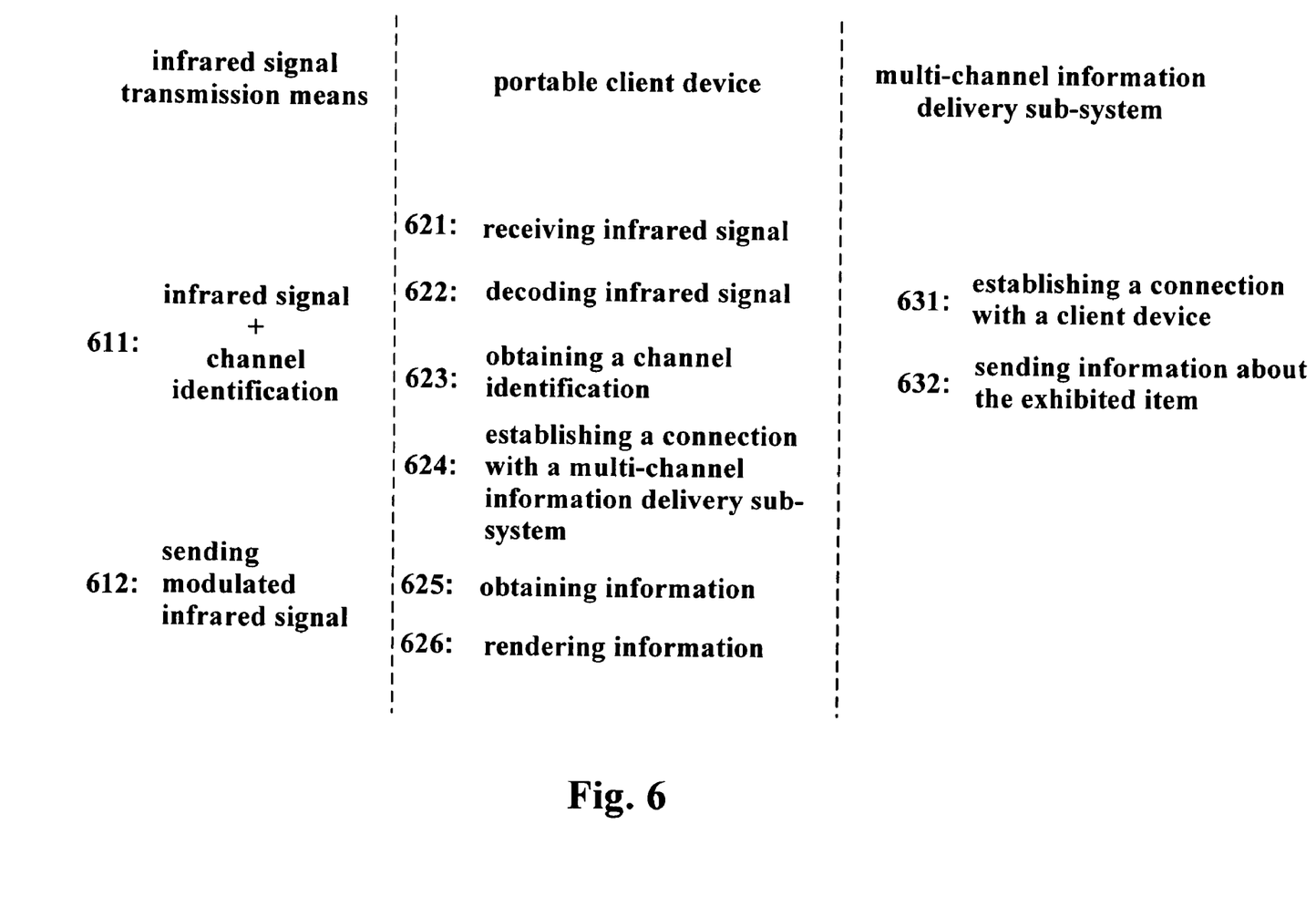
FIG. 6 shows a directional information delivery method according to the invention.

FIG. 6 shows the directional information delivery method according to the invention. As shown in FIG. 6, in the directional information delivery method according to the invention, a wide-angle infrared signal transmission means attached on a corresponding exhibited item modulates an infrared signal, and sends the infrared signal to a specified area in wide angle, the infrared signal carries thereon a channel identification for identifying a channel, wherein the channel identification indicates the channel for transferring the information of an exhibited item attached with the wide-angle infrared signal transmission means; a portable client device receives the infrared signal from a wide-angle infrared signal transmission means in a predefined direction, and decodes the infrared signal to obtain a channel identification, establishes a connection with an information delivery sub-system based on the channel identification obtained, and obtains information from the channel indicated by the channel identification and renders that information. Among them, the information delivery sub-system may be a radio or a Web server, and the channel identification may be a FM frequency or a Web page's URL, accordingly, the portable client device can be provided with a radio receiver or a Web browser.

In FIG. 6, in order to clearly indicate that the directional information delivery method according to the invention is accomplished cooperatively by the wide-angle infrared signal transmission means, the portable client device and the information delivery sub-system, the whole method step is divided into three sections, each is accomplished by a corresponding device, that is: an infrared signal transmission means modulates an infrared signal (611), then sends the infrared signal to a specified area in wide angle (612); a portable client device receives the infrared signal from a wide-angle infrared signal transmission means in a predefined direction (621), and decodes the infrared signal (622) to obtain a channel identification (623), establishes a connection with an information delivery sub-system based on the channel identification obtained (624), obtains information from the channel indicated by the channel identification (625) and renders that information (626); and the information delivery sub-system establishes a connection with the client device (631) and sends information about the exhibited item to the client device (632).

The invention is illustrated and described above with reference to preferred embodiments, however, those skilled in the art will appreciate that the term "exhibited item" is not limited to environments such as a trade show or an exhibition, since the invention is also applicable to other scenarios that need to deliver information to a user, such as in a supermarket, etc., the term "exhibited item" should have broad meanings in the invention.

Although the invention is illustrated and described with reference to preferred embodiments, those skilled in the art will appreciate that various modifications in form and detail can be made without departing from the spirit and scope of the invention.

The invention claimed is:

1. A directional information delivery system, comprising:
a wide-angle electromagnetic wave transmitter for transmitting electromagnetic waves from an object to a specified area in wide angle, the electromagnetic wave carrying thereon a channel identification for identifying a channel for transferring information regarding said object;
an information delivery sub-system for wireless transfer of information regarding at least one object via at least one channel; and
a portable client device, comprising: a directional electromagnetic wave receiver for receiving electromagnetic wave from a wide-angle electromagnetic wave transmitter in a specified direction and for obtaining a channel identification from the electromagnetic wave; and information reception means for establishing a connection with the information delivery sub-system based on the channel identification obtained by the directional electromagnetic wave receiver and for obtaining information from the channel indicated by the channel identification.

2. The directional information delivery system according to claim 1, wherein said wide-angle electromagnetic wave transmitter means is an all-directional electromagnetic wave transmitter.

3. The directional information delivery system according to claim 1, wherein said wide-angle electromagnetic wave transmitter is a wide-angle infrared transmitter, and said directional electromagnetic wave receiver is a directional infrared receiver.

4. The directional information delivery system according to claim 1, wherein said wide-angle electromagnetic wave transmitter is a wide-angle visible light transmitter, and said directional electromagnetic wave receiver is a directional visible light receiver.

5. The directional information delivery system according to claim 1, wherein said channel identification comprises a frequency for identifying a FM channel, said information delivery sub-system comprises a FM radio for transferring information of respective objects via a plurality of respective FM channels, and said information reception means comprises a FM radio receiver.

6. The directional information delivery system according to claim 1, wherein said channel identification comprises a Uniform Resource Locator for identifying a Web page, said information delivery sub-system comprises a Web server, wherein respective Web pages are utilized to store the information of respective objects, and said information reception means comprises a Web browser.

7. The directional information delivery system according to claim 6, wherein said portable client device further comprises a reception mode selection means for activating a corresponding information reception means based on at least one of a property of said information reception means and user selection.

8. The directional information delivery system according to claim 1, wherein said portable client device works in a view-and-select manner.

9. The directional information delivery system according to claim 1, wherein said directional electromagnetic wave receiver works in a view-and-select manner.

10. A directional information delivery system, comprising:
a wide-angle electromagnetic wave transmitter for transmitting electromagnetic waves from an object to a specified area in wide angle, the electromagnetic wave carrying thereon a channel identification for identifying a channel for transferring information regarding said object;
an information delivery sub-system for wireless transfer of information regarding at least one object via at least one channel; and
a portable client device, comprising: a directional electromagnetic wave receiver for receiving electromagnetic wave from a wide-angle electromagnetic wave transmitter in a specified direction comprising an optical part for allowing electromagnetic wave coming from a specified direction to pass; an electromagnetic wave detector for receiving the electromagnetic wave passing through the optical part; and a decoder for decoding the electromagnetic wave signal received by the electromagnetic wave detector to obtain a channel identification carried by the electromagnetic wave signal; and information reception means for establishing a connection with the information delivery sub-system based on the channel identification obtained by the directional electromagnetic wave receiver and for obtaining information from the channel indicated by the channel identification.

11. A directional information delivery method, comprising the steps of:
  transmitting electromagnetic wave from an object to a specified area by a wide-angle electromagnetic wave transmitter, the electromagnetic wave carrying thereon a channel identification for identifying a channel, wherein the channel identification indicates the channel for transferring the information of the object attached with the wide-angle electromagnetic wave transmitter; and
  receiving electromagnetic waves coming from a wide-angle electromagnetic wave transmitter in a specified direction by a portable client device comprising an optical part for allowing electromagnetic wave coming from a specified direction to pass; an electromagnetic wave detector for receiving the electromagnetic wave passing through the optical part; and a decoder for decoding the electromagnetic wave signal received by the electromagnetic wave detector to obtain a channel identification from the electromagnetic wave, establishing a connection with an information delivery sub-system based on the channel identification obtained, and obtaining information from the channel indicated by said channel identification.

12. The directional information delivery method according to claim 11, wherein said transmitting in wide angle is transmitting in all direction.

13. The directional information delivery method according to claim 11, wherein said electromagnetic wave is infrared.

14. The directional information delivery method according to claim 11, wherein said electromagnetic wave is visible light.

15. The directional information delivery method according to claim 11, wherein said channel identification comprises a frequency for identifying an FM channel.

16. The directional information delivery method according to claim 11, wherein said channel identification comprises a Uniform Resource Locator for identifying a Web page.

17. The directional information delivery method according to claim 16, further comprising a reception mode selecting step for establishing a connection with an information delivery sub-system in a corresponding manner based on at least one of a property of said portable client device and user selection, and obtaining information from the channel indicated by said channel identification and rendering that information.

18. The directional information delivery method according to claim 11, wherein said portable client device works in a view-and-select manner.

* * * * *